(12) United States Patent
Golla et al.

(10) Patent No.: US 8,225,034 B1
(45) Date of Patent: Jul. 17, 2012

(54) HYBRID INSTRUCTION BUFFER

(75) Inventors: Robert T. Golla, Round Rock, TX (US); Yue Chang, Cambridge, MA (US); Jama I. Barreh, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 2106 days.

(21) Appl. No.: 10/881,215

(22) Filed: Jun. 30, 2004

(51) Int. Cl.
*G06F 12/00* (2006.01)
*G06F 13/00* (2006.01)
*G06F 13/28* (2006.01)

(52) U.S. Cl. ....................................................... 711/109
(58) Field of Classification Search .................... 711/109
See application file for complete search history.

(56) References Cited

U.S. PATENT DOCUMENTS

| | | | |
|---|---|---|---|
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,515,308 A | 5/1996 | Karp et al. | |
| 5,546,593 A | 8/1996 | Kimura et al. | |
| 5,619,439 A | 4/1997 | Yu et al. | |
| 5,954,789 A | 9/1999 | Yu et al. | |
| 6,076,157 A | 6/2000 | Borkenhagen et al. | |
| 6,088,788 A | 7/2000 | Borkenhagen et al. | |
| 6,088,800 A | 7/2000 | Jones et al. | |
| 6,105,127 A | 8/2000 | Kimura et al. | |
| 6,131,104 A | 10/2000 | Oberman | |
| 6,212,544 B1 | 4/2001 | Borkenhagen et al. | |
| 6,279,101 B1 * | 8/2001 | Witt et al. .................. | 712/215 |
| 6,282,554 B1 | 8/2001 | Abdallah et al. | |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,381,689 B2 * | 4/2002 | Witt et al. .................. | 712/215 |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,434,699 B1 | 8/2002 | Jones et al. | |
| 6,496,925 B1 | 12/2002 | Rodgers et al. | |
| 6,507,862 B1 | 1/2003 | Joy et al. | |
| 6,523,050 B1 | 2/2003 | Dhablania et al. | |
| 6,564,328 B1 | 5/2003 | Grochowski et al. | |
| 6,567,839 B1 | 5/2003 | Borkenhagen et al. | |
| 6,594,681 B1 | 7/2003 | Prabhu | |

(Continued)

OTHER PUBLICATIONS

Tulsen et al., "Power-sensitive multithreaded architecture," IEEE 2000, pp. 199-206.

(Continued)

*Primary Examiner* — Kevin Ellis
*Assistant Examiner* — Gary W Cygiel
(74) *Attorney, Agent, or Firm* — Robert C. Kowert; Meyertons, Hood, Kivlin, Kowert & Goetzel, P.C.

(57) ABSTRACT

In one embodiment, a storage buffer includes a plurality of storage locations configured to store a plurality of incoming instructions. The storage buffer also includes a shift FIFO that is coupled to the plurality of storage locations. The shift FIFO includes an entry configured to store an instruction that is next in a program order. In response to receiving a shift signal, control functionality that is coupled to the plurality of storage locations and to the shift FIFO may cause the instruction that is next in the program order to be moved from a given location of the plurality of storage locations to the entry of the shift FIFO.

25 Claims, 7 Drawing Sheets

U.S. PATENT DOCUMENTS

| | | |
|---|---|---|
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,728,845 B2 | 4/2004 | Adiletta et al. |
| 6,748,556 B1 | 6/2004 | Storino et al. |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |
| 6,915,412 B2 * | 7/2005 | Nguyen et al. ............... 712/23 |
| 2002/0007450 A1 * | 1/2002 | Witt et al. .................. 712/23 |
| 2004/0098565 A1 * | 5/2004 | Rohlman et al. ............. 712/214 |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within a Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

FIG. 3

| Thread state | Ready | Ready | Wait | Ready | Ready | Ready | Ready | Ready | Ready |
|---|---|---|---|---|---|---|---|---|---|
| Cancel pick | | | | | | | | | |
| Completion Status | | | | | | | | | |
| Pick (P) | Integer Load | Depend Op | Depend Op | | | | | | |
| Decode (D) Read IRF | | Integer Load | | Depend Op | | | | | |
| Execute (E) Read FRF | | | Integer Load | | Depend Op | | | | |
| Memory (M) | | | | Integer Load | | Depend Op | | | |
| Bypass (B) | | | | | Integer Load | | Depend Op | | |
| Writeback (W) | | | | | | Integer Load | | Depend Op | |
| Execution cycle | 0 | 1 | 2 | 3 | 4 | 5 | 6 | 7 | 8 |

FIG. 5

HYBRID INSTRUCTION BUFFER

BACKGROUND OF THE INVENTION

1. Field of the Invention

This invention relates to multithreaded processors and, more particularly, to thread selection in a multithreaded processor.

2. Description of the Related Art

Computer processor designs have been improved in a number of ways. Microarchitectures have evolved from single execution unit machines to superscalar designs having multiple pipelines and multiple execution units. To accommodate changing processing environments such as server based applications, for example, a more recent processor design trend includes multithreaded processors capable of executing multiple threads concurrently.

One aspect of multithreading involves thread selection. A thread may have various instruction dependencies that may cause it to stall in the pipeline, while another thread may be able to execute. While the instructions corresponding to the threads are waiting to be selected, they may be stored in an instruction buffer. In general, the design of an instruction buffer may determine its power consumption. Additionally, some buffer structures may require multiplexing which may incur an unacceptable delay due to loading.

SUMMARY

Various embodiments of a hybrid storage buffer are disclosed. In one embodiment, a storage buffer includes a plurality of storage locations configured to store a plurality of incoming instructions. The storage buffer also includes a shift FIFO that is coupled to the plurality of storage locations. The shift FIFO includes an entry configured to store an instruction that is next in a program order. In response to receiving a shift signal, control functionality that is coupled to the plurality of storage locations and to the shift FIFO may cause the instruction that is next in the program order to be moved from a given location of the plurality of storage locations to the entry of the shift FIFO.

In one specific implementation, the control functionality may receive the shift signal at the end of a current cycle and the instruction that is next in the program order may be available to be read from the entry of the shift FIFO in a next subsequent cycle.

BRIEF DESCRIPTION OF THE DRAWINGS

FIG. 3 is a pipeline diagram illustrating the flow of integer instructions through one embodiment of the core of FIG. 2.

FIG. 5 is a pipeline diagram illustrating the flow of an integer load instruction and a dependent operation through one embodiment of the core of FIG. 2.

Figure 1:
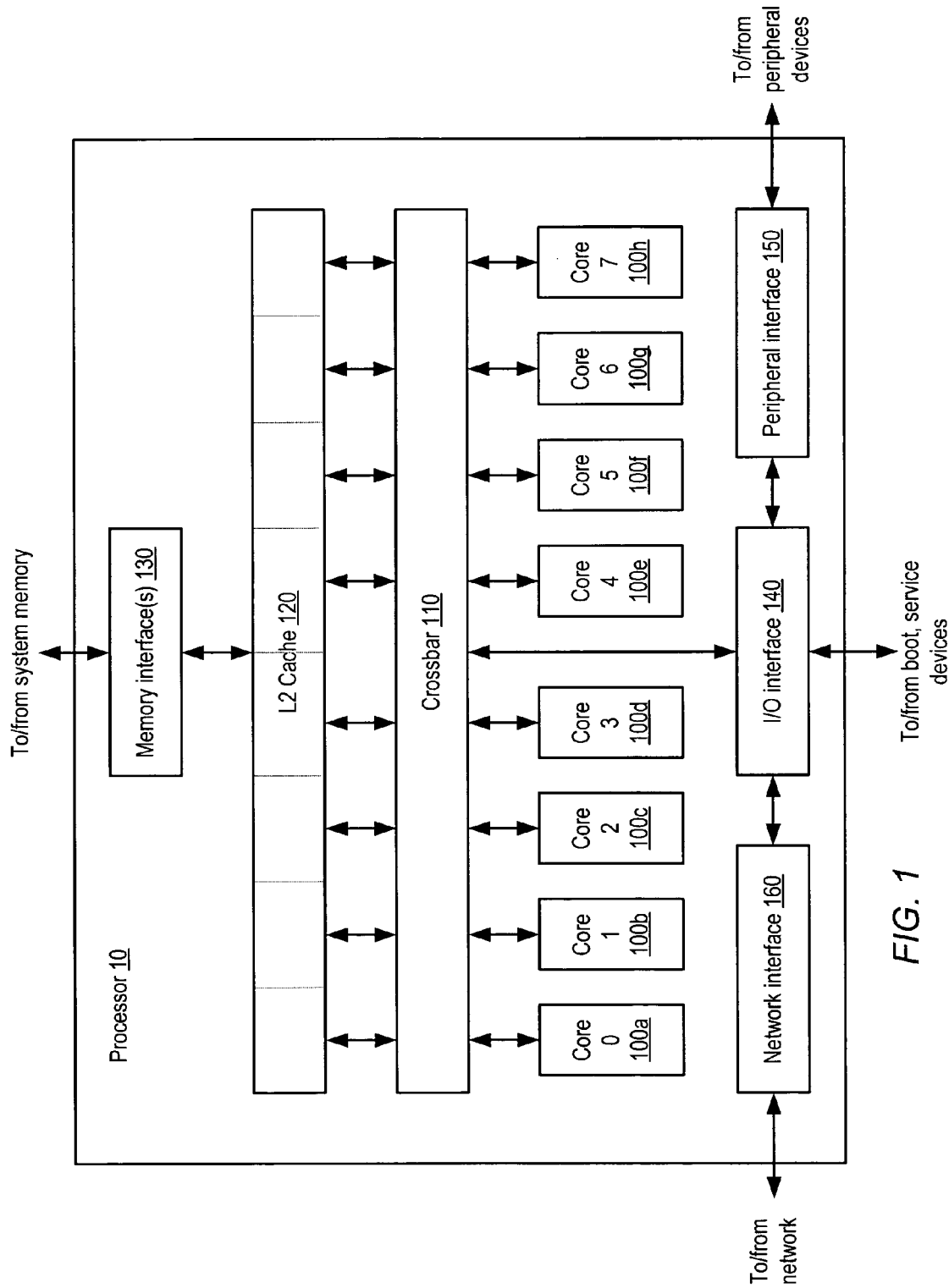
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 5, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
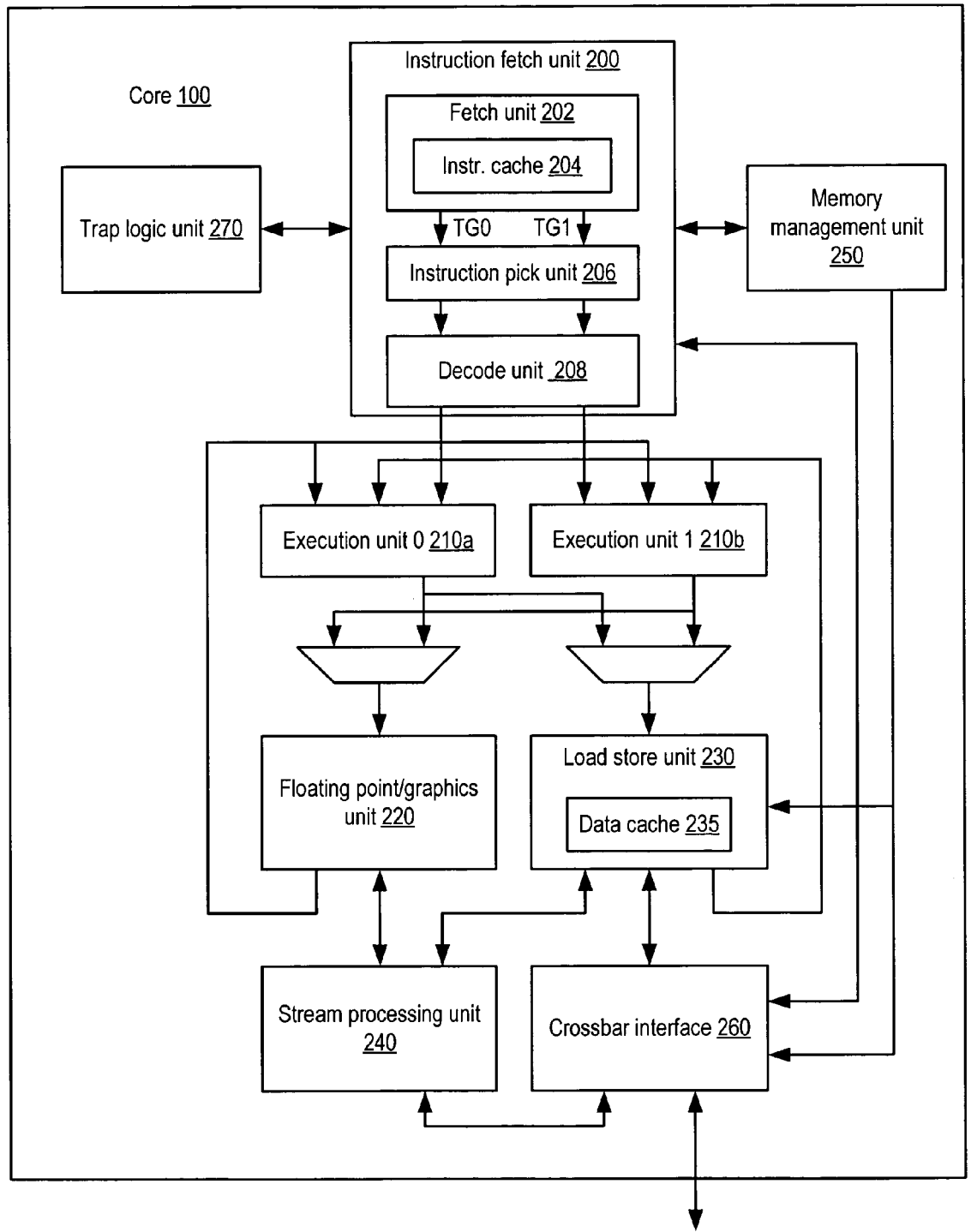
FIG. 2 is a block diagram of one embodiment of a core, as illustrated in FIG. 1, configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer (not shown in FIG. 2) corresponding to each thread in which several recently fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another.

As will be described in further detail below in conjunction with the descriptions of FIG. 4 and FIG. 5, in one embodiment, pick unit 206 may employ an instruction selection algorithm that takes instruction scheduling factors into account. As such, a picked instruction may be canceled during the cycle in which it is picked. For example, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic). However, it is noted that in some embodiments, pick unit 206 may schedule instructions before all factors affecting instruction scheduling are known (e.g., instruction dependencies, implementation-specific resource hazards, etc.), in which case a picked instruction may be canceled at a later execution stage. Further, it is contemplated that in some embodiments, pick unit 206 may be configured to select more than two instructions for execution in a given execution cycle, or may select instructions from all threads rather than specific groups of threads.

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In addition, in some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210*a-b* may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210*a* may be configured to execute integer instructions issued from TG0, while EXU1 210*b* may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210*a* may store integer register state for each of threads 0-3 while EXU1 210*b* may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Exemplary Core Pipeline Functionality

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. Since there are no stalls shown, each of the instructions shown in the pipeline may be independent of each other instruction. In other words, the instructions may not have any conflicting dependencies. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

The Pick Process

As described above, pick unit 206 may attempt to select from each of TG0 and TG1 one instruction to schedule for execution, such that two instructions may be independently selected during a given execution cycle. Details of the pick process are described below. FIG. 4 is a block diagram including further aspects of the instruction fetch unit 200 shown in FIG. 2. In addition to the functional blocks depicted in FIG. 2, fetch unit 202 includes instruction buffers 0 through 7. Further, pick unit 206 of FIG. 4 includes hazard detection and scheduling functionality 406, a least recently picked (LRP) unit 0, designated 407A, and a LRP unit 1, designated 407B.

In the illustrated embodiment, each of instruction buffers 0-7 are configured to store fetched instructions that correspond to a respective thread. Each instruction buffer may include a plurality of storage locations for storing a plurality of instructions. Instruction buffers 0-3 belong to TG0 and instruction buffers 4-7 belong to TG1. It is noted that the program order of the instructions may be maintained by instruction buffers 0-7 such that the instructions are provided in program order. In one embodiment, each of instruction buffers 0-7 may receive the instructions not in program order but may provide the instructions in proper the program order. In such an embodiment, one specific location, referred to as the pick location, in each instruction buffer may be designated for storage of the oldest instruction stored within a given buffer. The pick location of each instruction buffer may include a valid instruction indication, designated "V" that may be used by an LRP algorithm. As the oldest instruction is stored into the pick location of each instruction buffer 0-7 the valid bit is set to a value which indicates that a valid instruction is present. Conversely, if there is no valid instruction in the picked location, the valid bit may be set to a value which indicates that a valid instruction is not present an the entry is invalid. It is contemplated that in other embodiments, other numbers of instruction buffers may be used and they may also belong to other numbers of thread groups. It is further noted that in alternative embodiments, the instructions may be provided to instruction buffers 0-7 in program order.

In the illustrated embodiment, LRP 0 and LRP 1 provide control signals designated Cntrl 0 and Cntrl 1, respectively, to the each of instruction buffers in thread groups TG0 and TG1. In one embodiment, the control signals may include signals such as a shift signal, for example, that may cause the next oldest instruction to be loaded into the pick location within each instruction buffer. It is noted that in other embodiments, other signals may be used that have other functionality.

In the illustrated embodiment, LRP units 0 and 1 may each independently determine, using an LRP selection algorithm (described below), from which thread in the respective thread groups to pick an instruction in each cycle. During each cycle, the least recently picked, valid instruction from a ready thread may be selected and sent to decode unit 208. In one embodiment, each of LRP units 0 and 1 may maintain a thread state machine in which a given thread may be in one of two states: ready or wait. A ready thread may be picked and sent down the pipeline, while a thread in the wait state is not eligible to be picked.

Although each thread may start in the ready state, a thread may transition into the wait state for various reasons or "wait conditions," examples of which are described further below, and may remain in the wait state until the condition or conditions that caused it to transition are resolved. Thus, a thread may enter the wait state for one cycle or a number of cycles depending on the wait condition that may be present.

In one embodiment, during a pick initiation process, the instruction stored in the pick location of each of instruction buffers 0-7 may be at least partially decoded in parallel with LRP 0 and LRP 1 picking an instruction according to the LRP algorithm.

More particularly, hazard detect and scheduling unit 406 may include circuitry that may detect certain hazards and scheduling dependencies that may cause a wait condition to determine whether a given instruction should or should not be sent to the decode stage in either the current cycle or subsequent cycles. If hazard detect and scheduling unit 406 detects such hazards or dependencies for a given instruction(s), hazard detect and scheduling unit 406 may notify LRP 0 and 1 with a wait indication to cause the thread corresponding to the instruction to transition to the wait state to allow dependency and/or hardware hazards to resolve.

In addition, if hazard detect and scheduling unit 406 detects such hazards or dependencies for a thread that is already picked for the current cycle, a cancel indication may be provided to the corresponding LRP unit (e.g., LRP 0, LRP 1). In response to the cancel indication, the pick will be canceled for the current cycle and the picked thread may be transitioned to the wait state the following cycle. It is noted that if the pick is canceled, the shift signal may not be provided to the corresponding buffer; thereby allowing the instruction to still be available in the pick location in the buffer. In addition, the LRP sequence may not be updated for that thread. Thus, when the thread transitions to the ready state for subsequent pick cycles, the thread may be picked. In certain cases, the wait condition may resolve in the same cycle in which it transitioned to the wait state. If the wait condition will resolve by the next cycle, the thread may still be canceled for the current cycle, but the thread will not transition to the wait state and thus may be eligible to be picked the next cycle. In either case, if a pick is canceled a hole or bubble may be created in the pipeline for the corresponding thread group for at least that cycle.

If there are no dependencies or hazards detected for the picked instruction, a signal such as the shift signal, for example, may be provided to the corresponding instruction buffers by LRP 0 and LRP 1. In addition to the shift signal causing the next oldest instruction within the buffer to be loaded into the one pick location, the picked instruction for each thread group may be provided to decode unit 208.

In one embodiment, during each cycle, the LRP algorithm used by each of LRP 0 and LRP 1 may use an LRP sequence to select a thread. The LRP sequence represents the order in which the ready threads may be picked. Each time a thread is picked, the sequence is updated and the picked thread becomes the most recently picked and moves to the end of the sequence. If a thread is canceled after being picked, the LRP sequence for the canceled thread is not updated; thus that thread may not lose its place in the LRP sequence when it transitions back to the ready state. For example, assume the LRP sequence for TG0 in the current cycle is 1,3,2,0. Further, if thread 1 is canceled after it is picked and is in the wait state for one cycle, the LRP sequence will stay 1, 3,2,0 for the next cycle. However, since thread 1 is not ready, it is not eligible to be picked, and thread 3 will be picked. The following cycle when thread 1 'wakes up' and transitions to the ready state, the LRP sequence becomes 1,2,0,3. Thus, thread 1 did not lose its place in the LRP sequence. The ready state may be thought of as a masking function for the LRP sequence. In one embodiment, when a thread is transitioned to the wait state, it will be transitioned to the ready state as soon as the condition upon which the thread is waiting is resolved.

As noted above, there may be many dependencies and/or hazard conditions which may cause a thread to transition to a wait state or be canceled. In Table 1 below, an exemplary listing of conditions and/or hazards that may cause a thread to transition to a wait state or to be canceled during pick is illustrated. It is noted that the examples in Table 1 do not represent an exhaustive list of dependencies and hazards. It is further noted that the dependencies and/or hazard conditions may be detected at various stages within the pipeline.

TABLE 1

Example wait state conditions

Condition

A delayed control-transfer-instruction is valid at the pick stage and a corresponding delay slot has not yet been stored within instruction buffers 0-7.
If a store doubleword instruction is valid at the pick stage and an integer load is at decode.
If a dependency exists between one of the instruction sources at the pick stage and one of the instructions producing the result in a stage further down in the pipeline.
If there would be a write after write hazard caused by the instruction at the pick stage and a prior floating point instruction is already further down the pipe (e.g., a floating point op followed by load-float).
A window instruction is valid at the pick stage and there is a prior instruction at decode
A floating point instruction with single precision sources is valid at the pick stage and a prior floating point instruction producing a double precision result is already further down the pipeline.
A floating point instruction with double precision sources is valid at the pick stage and a prior floating point instruction producing a single precision result is already further down the pipeline.
A floating point instruction with floating point condition code sources is valid at the pick stage and a prior floating point instruction producing floating point condition code results is already further down the pipeline.
A load or store floating point status register instruction is valid at the pick stage and any floating point instruction is already further down the pipeline.
A store instruction is valid at the pick stage and a store buffer is currently full.
A divide instruction is valid at the pick stage and one or more divides are currently outstanding.
A floating point instruction with double precision sources is valid at the pick stage and a prior load producing a floating point single precision result missed the data cache.

An Exemplary Pipeline Diagram Including a Cancel Pick

An exemplary pipeline diagram illustrating the flow of an integer load instruction and a dependent operation from one thread through one embodiment of core 100 is shown in FIG. 5. Although the pipeline diagram of FIG. 5 is similar to the pipeline diagram of FIG. 3, the Fetch (F) and Cache (C) stages have been omitted for simplicity. Thus, the pipeline of FIG. 5 is shown beginning with the pick (P) stage and including six stages: Pick (P), Decode (D), Execute (E), Memory (M), Bypass (B), and Writeback (W). Two additional rows have also been added to the diagram of FIG. 5 to show the cancel pick indication and the internal completion status.

During the Pick stage, pick unit 206 may be configured in one embodiment to select at most two instructions to issue, one for each thread group as described above. However, for discussion purposes, the two instructions are issued from the same thread, such as would be the case if the all of other threads were in the wait state. Source dependencies of the selected instructions on previously issued instructions from a given thread may also be detected by hazard detect and scheduling unit 406 during the Pick stage. For example, referring collectively to FIG. 3 through FIG. 5, an integer load instruction is picked in cycle 0 of FIG. 5. The thread state corresponding to the integer load is ready.

In the next cycle (cycle 1), an instruction which is dependent on the integer load has been picked and the dependency is detected in the same cycle. In the illustrated embodiment, the dependency may correspond to the data operand not being available at the execution stage until cycle 5. Accordingly, the dependent op has been canceled in cycle 1 and has transitioned to the wait state for one cycle (cycle 2). In the illustrated embodiment, speculation about whether the load will hit in the data cache is enabled. The integer load propagates down the pipeline through the Decode stage. For this integer load, data operands may be selected during the Decode stage, which may be retrieved from the integer register file. In the Execute stage, one of the execution units 210 may calculate the load address. It is noted that the cancellation and transitioning to the wait state for one cycle of the dependent op creates a two-cycle hole in the pipeline for that thread. However, it is noted that during cycle 2, an instruction may have been picked from a different thread in the same thread group that was ready (not shown). Thus, the pipeline may actually have only one hole.

During the Memory stage of the integer load instruction, data cache 235 may be accessed, while during the Bypass stage, LSU 230 may determine whether a data cache hit or miss occurred. In this example, since speculation is enabled, a hit is assumed, such that in cycle 4, data may be forwarded to the appropriate execution unit 210. The data may be committed during the Writeback stage in cycle 5. The forwarded data may be used by the dependent op in cycle 5. Thus, pick unit 206 woke up the thread with the dependent operation and transitioned it to the ready state in time to operate on the forwarded data.

In one embodiment, to accommodate canceling of the pick in the same cycle in which an instruction is picked, the cancel pick indication, and thus the shift signal (described above), may be provided late in the cycle. Thus, the timing of the shift signal may play a critical role in allowing the next oldest instruction to be placed into the pick location of the instruction buffer corresponding to the thread that was just picked. In this way, that thread may be eligible for pick by LRP 0 or LRP 1 the next cycle. It is noted that instruction buffers 0-7 shown in FIG. 4 may be illustrative any type of buffer such as a shift FIFO or a queue structure, for example. However, it is also noted that certain conventional queue structures may not meet the timing requirements of the some specific implementations due to the large fan out that may be necessary to drive multiplexer logic associated with queue structures. Further, certain conventional shift FIFO structures may also have delays associated with driving a large number of clocked elements with a single shift clock. In addition, shift FIFO structures may consume a lot of power due to the shifting of the information in each location during each cycle in which data is shifted. As will be described in greater detail below in conjunction with the description of FIG. 6, a hybrid buffer may be implemented for each of instruction buffers 0-7.

Hybrid Buffer Structure

Figure 6:
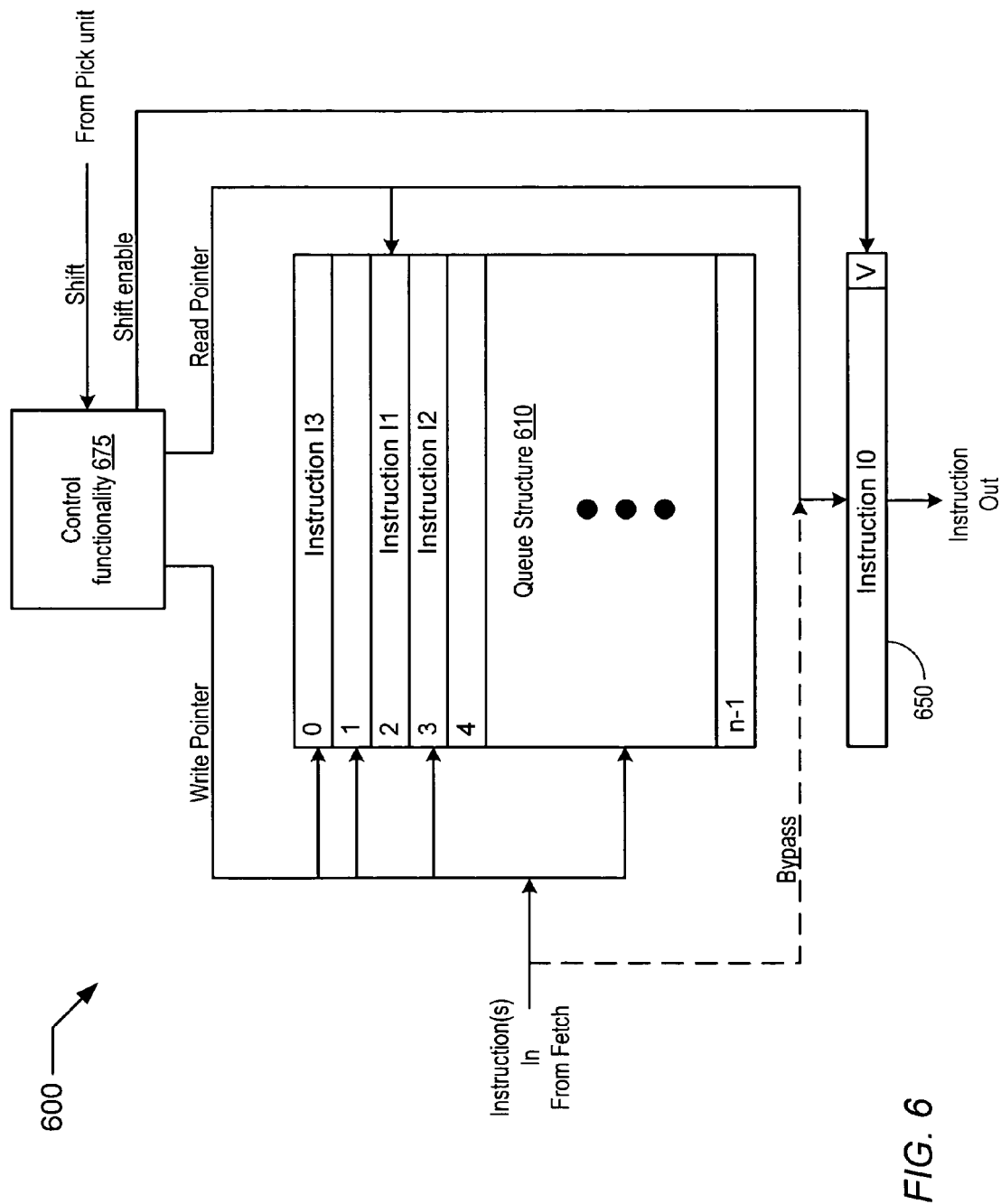
FIG. 6 is a block diagram of one embodiment of the instruction buffer shown in of FIG. 4.

FIG. 6 is a block diagram of one embodiment of a hybrid instruction buffer. The instruction buffer 600 includes queue structure 610 which is coupled to a FIFO structure 650. In addition, hybrid instruction buffer 600 includes control functionality 675 that is coupled to both the queue structure 610 and the FIFO structure 650.

In the illustrated embodiment, queue structure 610 includes a plurality of storage locations designated 0 through n−1, where n−1 may be any integer number. In one embodiment, an instruction may be written into any available location within queue structure 610 each cycle. In one embodiment, the write pointer shown in FIG. 6, includes pointers to four locations. Accordingly, in the illustrated embodiment, up to four locations may be written in each cycle. In a given cycle, up to four instructions from a single thread may be provided to instruction buffer 600. In one embodiment, the instructions may be in program order. In another embodiment, the instructions may not be in program order. In either embodiment, control functionality 675 may keep track of the program order of the instructions using an ordering mechanism. In the illustrated embodiment, four instructions are stored within instruction buffer 600. The instructions are I0, I1, I2 and I3, where I0 is the oldest instruction and I3 is the newest instruction in program order. Instructions I1, I2 and I3 are stored in queue structure 610. It is noted that in other embodiments it is contemplated that other numbers of instructions may be stored within queue structure 610 in each cycle.

In the illustrated embodiment, FIFO structure 650 includes a single storage location for storing instruction I0 (e.g., the oldest instruction in program order). In various embodiments, FIFO structure 650 may be implemented using a flip-flop based design or a latch based design as desired.

Control functionality 675 is configured to control writing and reading of hybrid buffer 600. In the illustrated embodiment, control functionality 675 may receive a shift signal from, for example, pick unit 206 of FIG. 4. In response to the shift signal, control functionality 675 may provide a shift enable signal to FIFO structure 650. In one embodiment, the shift enable signal may cause the instruction stored at the location pointed to by the read pointer to be latched by FIFO structure 650. The read pointer may be implemented using one or more multiplexers that select the next instruction. In such an embodiment, the multiplexer selects may be based in part on the program order of the instructions.

When a valid instruction is shifted into FIFO structure 650, control functionality 675 may set the valid bit to indicate there is a valid instruction present. In the illustrated embodiment, as instructions are shifted out of queue structure 610 and locations become available, instructions may be received from fetch, for example, and stored in any of the available locations. Control functionality 675 keeps track of the available locations and uses the write pointers to point to up to four locations to which incoming instructions should be written.

In one embodiment, if queue structure 610 is empty, as incoming instructions are received, control functionality 675 may determine which incoming instruction is the first instruction in the program order. In addition, control functionality 675 may bypass that first instruction directly to FIFO structure 650 (denoted by the dashed bypass wire).

Figure 4:
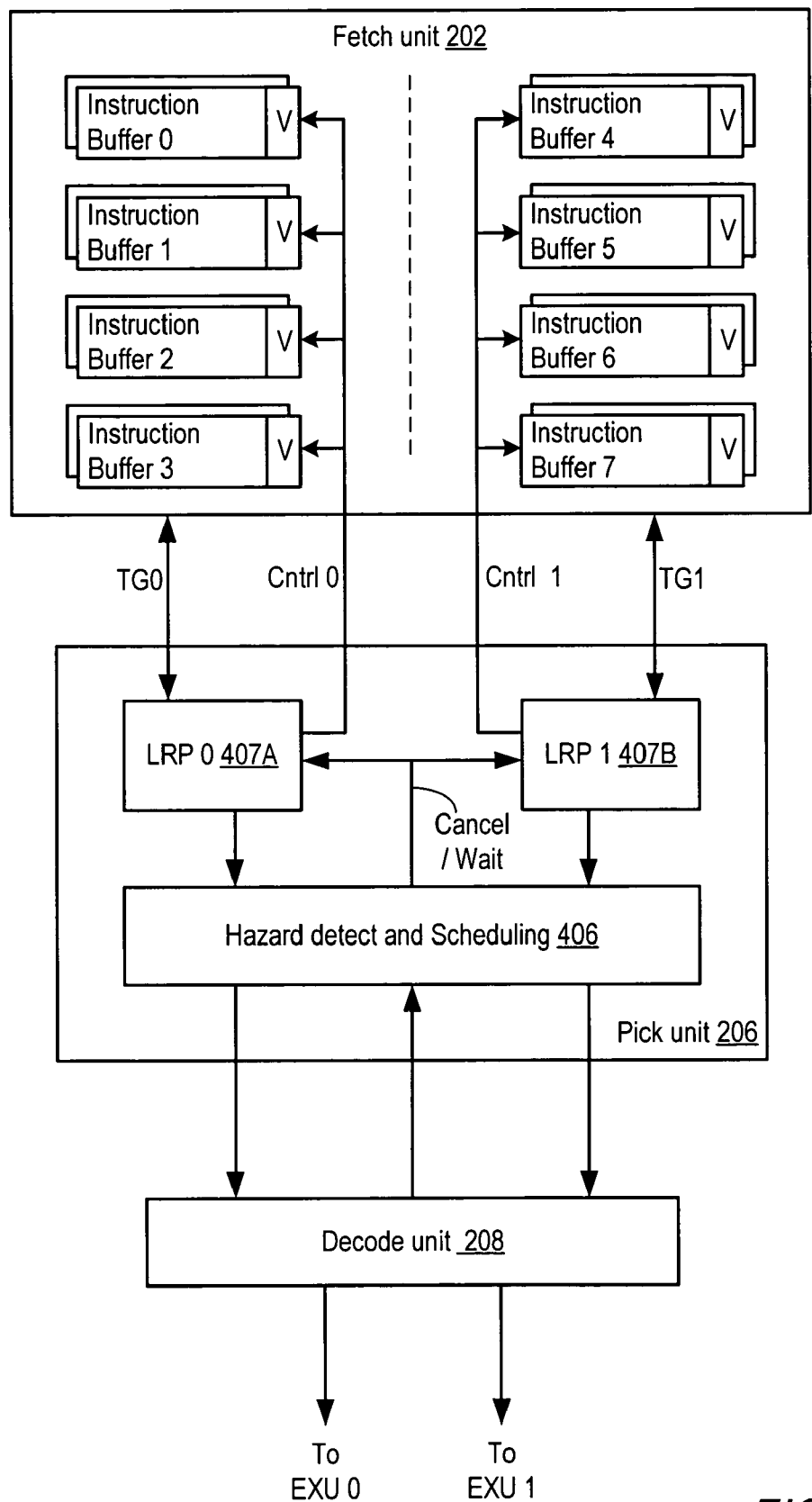
FIG. 4 is a block diagram illustrating more detailed aspects of one embodiment of the core of FIG. 2.

As described above in conjunction with the descriptions of FIG. 3 through FIG. 5, in one embodiment, an instruction may be shifted into FIFO structure 650 each cycle if the instruction currently stored within FIFO structure 650 has been picked in the previous cycle. The instruction being shifted in may be read and evaluated by hazard and dependency checking logic (e.g., hazard detect and scheduling unit 406) in the pick stage for the current cycle. The hazard and dependency logic may determine if hazards or dependencies exit which may prevent the instruction from being picked. This type of checking may require a large portion of the cycle. Thus, the shift signal may be provided to control functionality 675 late in the cycle.

In one embodiment, control functionality 675 may select the next instruction to be shifted while the pick logic determines whether to pick the instruction in FIFO structure 650. Accordingly, in response to the shift enable signal, FIFO structure 650 may be configured to latch the next oldest instruction provided by queue structure 610. FIFO structure 650 may be implemented to have a small set up time whereby the instruction just shifted in may be available for evaluation early in the next cycle. In addition, in the absence of a shift signal, the oldest instruction remains within FIFO structure 650; thereby allowing the oldest instruction to be read out in a subsequent cycle.

The buffer structure as illustrated in FIG. 6 may be repeated for each thread. For example, in one embodiment, eight instruction buffers may be provided, one for each of four threads in each of two thread groups (e.g., instruction buffers 0-7). As described above, an instruction may be picked from each thread group in a given cycle according to the thread selection algorithm. Since instructions are provided to the pick unit 206 from the FIFO structure 650 of the selected thread's instruction buffer, the selected (or "picked") instruction may be quickly provided to the pick unit at the beginning of the cycle. As such, the instructions may be provided to pick unit 206 more quickly than if the entire instruction buffer was implemented as a queue and the instruction had to be provided through a multiplexer stage of the queue structure.

As described above, during the cycle in which an instruction is picked, hazard detect and scheduling logic 406 may check for certain hazards that may result in cancellation of the pick for that instruction. If the pick is cancelled, the instruction may remain in FIFO structure 650 of its instruction buffer. If the pick is not cancelled, the next instruction in program order in the instruction buffer may be shifted into FIFO structure 650 of the instruction buffer so that it is available for possible selection in the next cycle. Furthermore, pick unit 206 provides a shift signal once it has determined whether or not the pick will be cancelled. This determination may not be made until late in the current cycle. The hybrid queue-FIFO structure 600 of the instruction buffer may allow for this late determination since minimal setup time may be needed to shift the next-oldest instruction into FIFO structure 650 of the instruction buffer. Shifting the next-oldest instruction into FIFO structure 650 from the queue structure 610 may allow for the shift determination to be made later in the cycle than if the entire buffer was implemented as a conventional shift FIFO in which all of the locations would have to be shifted.

It is noted that the hybrid queue-FIFO structure 600 of the instruction buffer may require less power than a conventional shift-FIFO instruction buffer design. In a clock-gated power management scheme, the clocks for the hybrid queue-FIFO design are turned on when the hybrid queue-FIFO is written. Generally, in a conventional shift FIFO instruction buffer design, the clocks are turned on whenever the buffers are shifted as well as written.

Exemplary System Embodiment

Figure 7:
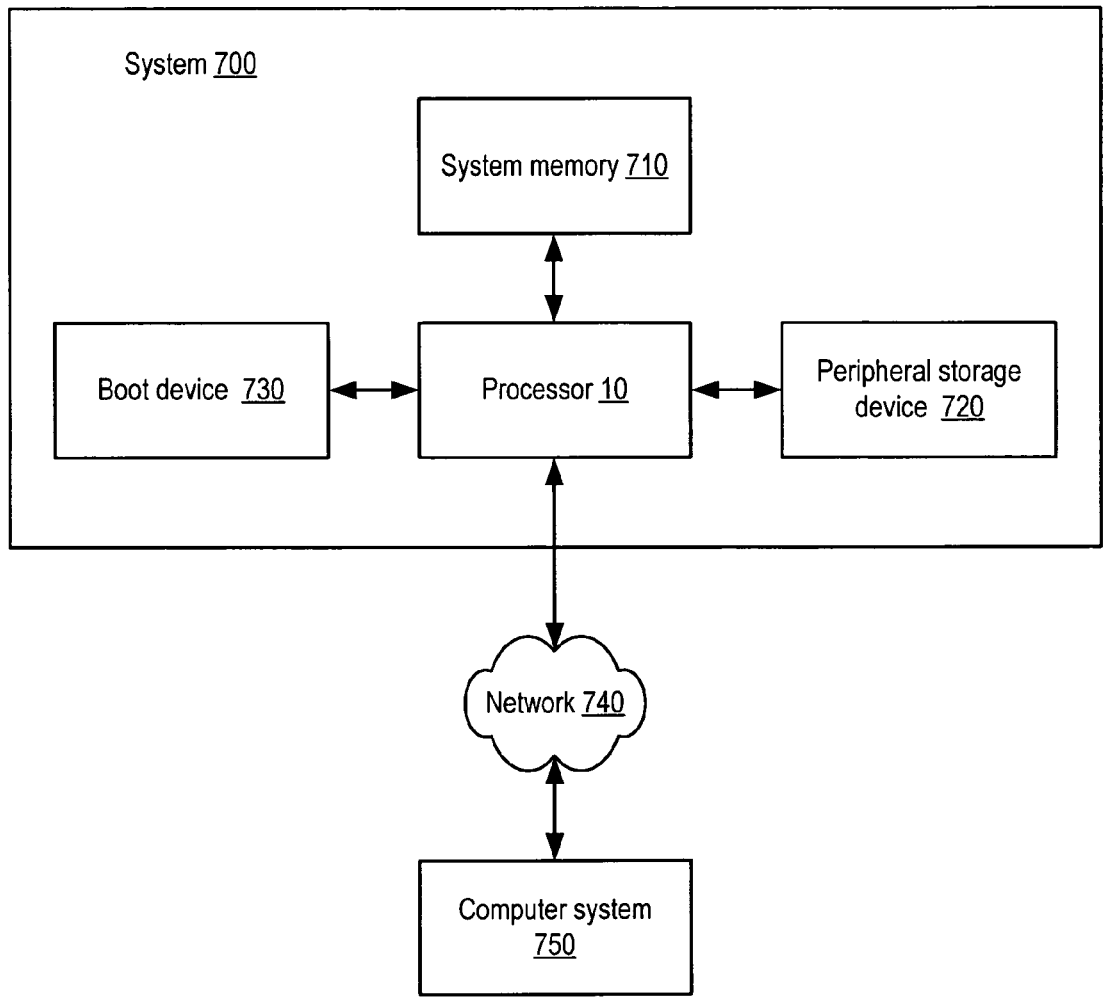
FIG. 7 is a block diagram of one embodiment of a system including a multithreaded processor.

As described above, in some embodiments processor 10 of FIG. 1 may be configured to interface with a number of external devices. One embodiment of a system including processor 10 is illustrated in FIG. 7. In the illustrated embodiment, system 700 includes an instance of processor 10 coupled to a system memory 710, a peripheral storage device 720 and a boot device 730. System 700 is coupled to a network 740, which is in turn coupled to another computer system 750. In some embodiments, system 700 may include more than one instance of the devices shown, such as more than one processor 10, for example. In various embodiments, system 700 may be configured as a rack-mountable server system, a standalone system, or in any other suitable form factor. In some embodiments, system 700 may be configured as a client system rather than a server system.

In various embodiments, system memory 710 may comprise any suitable type of system memory as described above, such as FB-DIMM, DDR/DDR2 SDRAM, or RDRAM®, for example. System memory 710 may include multiple discrete banks of memory controlled by discrete memory interfaces in embodiments of processor 10 configured to provide multiple memory interfaces 130. Also, in some embodiments system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A storage buffer, comprising:
    a queue portion including a plurality of storage locations configured to store any instruction of a plurality of incoming instructions in any location of the plurality of storage locations;
    a shift FIFO coupled to the queue portion, wherein the shift FIFO includes an entry configured to store an instruction that is next in a program order; and
    control functionality coupled to the queue portion and to the shift FIFO and configured to cause the instruction that is next in the program order to be moved from any given location of the plurality of storage locations to the entry of the shift FIFO in response to receiving a shift signal.

2. The storage buffer as recited in claim 1, wherein the control functionality is further configured to write the incoming instructions into selected ones of the plurality of storage locations indicated by one or more pointer indications.

3. The storage buffer as recited in claim 1, wherein the control functionality is further configured to maintain a program order of the incoming instructions.

4. The storage buffer as recited in claim 1, wherein the control functionality is further configured to receive the shift signal at the end of a current cycle.

5. The storage buffer as recited in claim 4, wherein the instruction that is next in the program order is available to be read from the entry of the shift FIFO in a next subsequent cycle.

6. The storage buffer as recited in claim 1, wherein the plurality of storage locations is a queue structure.

7. The storage buffer as recited in claim 2, wherein the one or more pointer indications are write pointers.

8. The storage buffer as recited in claim 1, wherein in response to the plurality of storage locations being empty, the control functionality is further configured to store a received instruction that is next in the program order into the shift FIFO by bypassing the plurality of storage locations.

9. A multithreaded processor, comprising:
    a fetch unit configured to fetch instructions corresponding to one or more threads; and
    a plurality of storage buffers each configured to store incoming instructions corresponding to one thread of the one or more threads, wherein each storage buffer includes:
        a plurality of storage locations configured to store any of the instructions corresponding to one thread of the one or more threads in any of the locations of the plurality of storage locations;
        a shift FIFO coupled to the plurality of storage locations, wherein the shift FIFO includes an entry configured to store an instruction that is next in a program order; and
        control functionality coupled to the plurality of storage locations and to the shift FIFO and configured to cause the instruction that is next in the program order to be moved from any given location of the plurality of storage locations to the entry of the shift FIFO in response to receiving a shift signal.

10. The multithreaded processor as recited in claim 9, wherein the control functionality is further configured to write the incoming instructions into selected ones of the plurality of storage locations indicated by one or more pointer indications.

11. The multithreaded processor as recited in claim 9, wherein the control functionality is further configured to maintain the program order of the incoming instructions.

12. The multithreaded processor as recited in claim 9, wherein the control functionality is further configured to receive the shift signal at the end of a current cycle.

13. The multithreaded processor as recited in claim 12, wherein the instruction that is next in the program order is available to be read from the entry of the shift FIFO in a next subsequent cycle.

14. The multithreaded processor as recited in claim 9, wherein the plurality of storage locations is a queue structure.

15. The multithreaded processor as recited in claim 10, wherein the one or more pointer indications are write pointers.

16. The multithreaded processor as recited in claim 9, wherein in response to the plurality of storage locations being empty, the control functionality is further configured to store a received instruction that is next in the program order into the shift FIFO by bypassing the plurality of storage locations.

17. A system, comprising:
a system memory;
a multithreaded processor coupled to the system memory, wherein the multithreaded processor includes:
a fetch unit configured to fetch from the system memory instructions corresponding to one or more threads; and
a plurality of storage buffers each configured to store incoming instructions corresponding to one thread of the one or more threads, wherein each storage buffer includes:
a plurality of storage locations configured to store any of the instructions corresponding to one thread of the one or more threads in any of the locations of the plurality of storage locations;
a shift FIFO coupled to the plurality of storage locations, wherein the shift FIFO includes an entry configured to store an instruction that is next in a program order; and
control functionality coupled to the plurality of storage locations and to the shift FIFO and configured to cause the instruction that is next in the program order to be moved from any given location of the plurality of storage locations to the entry of the shift FIFO in response to receiving a shift signal.

18. The system as recited in claim 17, wherein the control functionality is further configured to write the incoming instructions into selected ones of the plurality of storage locations indicated by one or more pointer indications.

19. The system as recited in claim 17, wherein the control functionality is further configured to maintain the program order of the incoming instructions.

20. The system as recited in claim 17, wherein the control functionality is further configured to receive the shift signal at the end of a current cycle.

21. The system as recited in claim 20, wherein the instruction that is next in the program order is available to be read from the entry of the shift FIFO in a next subsequent cycle.

22. A method for storing instructions, said method comprising:
storing a plurality of incoming instructions in any location of a plurality of storage locations;
storing an instruction that is next in a program order in an entry of a shift FIFO; and
causing the instruction that is next in the program order to be moved from any given location of the plurality of storage locations to the entry of the shift FIFO in response to receiving a shift signal.

23. The method as recited in claim 22 further comprising writing the incoming instructions into selected ones of the plurality of storage locations indicated by one or more pointer indications.

24. The method as recited in claim 22 further comprising receiving the shift signal at the end of a current cycle.

25. The method as recited in claim 24 further comprising causing the instruction that is next in the program order to be available to be read from the entry of the shift FIFO in a next subsequent cycle.

* * * * *